United States Patent [19]

Hubert et al.

[11] Patent Number: 4,869,446

[45] Date of Patent: Sep. 26, 1989

[54] COCKPIT ATMOSPHERE PROTECTION SYSTEM

[75] Inventors: James A. Hubert, Hampton, Va.; William G. Pickl, Huber Heights, Ohio

[73] Assignee: The United States of America as represented by the Secretary of the Air Force, Washington, D.C.

[21] Appl. No.: 255,802

[22] Filed: Oct. 11, 1988

[51] Int. Cl.[4] .............................................. B64D 11/00
[52] U.S. Cl. ..................................... 244/121; 600/21; 52/66; 135/96
[58] Field of Search .................. 244/121, 129.1, 129.4, 244/1 R; 52/64, 66, 2.1; 135/106, 96; 296/165, 174, 160; 600/21; 312/1

[56] References Cited

U.S. PATENT DOCUMENTS

| | | | |
|---|---|---|---|
| 1,806,366 | 5/1931 | Pivak | 244/121 |
| 1,937,520 | 12/1933 | Lightner | 244/121 |
| 2,811,725 | 11/1957 | Cence | 296/160 |
| 3,160,435 | 12/1964 | Smith | 135/96 |
| 3,212,812 | 10/1965 | Kurtz | 296/165 |
| 3,402,960 | 9/1968 | Erke | 135/96 |
| 3,766,844 | 10/1973 | Donnelly | 52/66 |
| 3,877,427 | 4/1975 | Alexeev et al. | 600/21 |
| 4,485,489 | 12/1984 | Pilié et al. | 2/2 |
| 4,485,534 | 12/1984 | Pilié et al. | 24/384 |

*Primary Examiner*—Galen L. Barefoot
*Attorney, Agent, or Firm*—B. D. Scearce; Donald J. Singer

[57] ABSTRACT

A system for protecting the cockpit of an aircraft from airborne contamination is described which comprises a generally tubular curtain of size corresponding to that of the canopy and cockpit and being pleated and collapsible along its length between an extended condition and a folded condition; a tray, attachable to and co-extensive with the canopy sill of the aircraft, the tray having a floor and inner and outer walls defining a circumferential recess for receiving the curtain in the folded condition; a lid for covering the tray with the bottom surface thereof in substantial contact with the inner and outer walls of the tray; a circumferential crimpable lip on each the floor of the tray and on the bottom surface of the lid for engaging respective ends of the curtain and providing peripheral hermetic seals between curtain and tray and between curtain and lid; inflatable circumferential seals in the sill and canopy for releasably attaching the tray to the sill and the lid to the canopy for providing hermetic seals between tray and sill and between lid and canopy; and a double zipper in the curtain along a pleat thereof for providing access to the cockpit with the curtain in the extended condition.

18 Claims, 4 Drawing Sheets

COCKPIT ATMOSPHERE PROTECTION SYSTEM

RIGHTS OF THE GOVERNMENT

The invention described herein may be manufactured and used by or for the Government of the United States for all governmental purposes without the payment of any royalty.

BACKGROUND OF THE INVENTION

The present invention relates generally to systems for protection of vehicles and operators thereof from airborne contamination, and more particularly to a flexible enclosure operable with the canopy of an aircraft for protecting cockpit and pilot from contamination.

Using chemical or biological weapons serves dual purposes both in causing direct casualties on enemy personnel and in forcing the enemy to function in a contaminated environment. Chemical or biological agents may exist in liquid or vaporous form dispersible as a mist or cloud. Once dispersed, little can be done to prevent external contamination to a facility, such as an airbase, and no suitable devices presently exist for protecting the cockpit of an aircraft from exposure to the agents if the airbase is chemically attacked. Contamination from airborne radioactive materials presents similar problems. Within technology existing prior to the invention herein, a pilot may be required to wear cumbersome protective clothing while operating the aircraft during a potentially extended period of time until the airbase and aircraft can be decontaminated. The protective clothing and associated gear may severely restrict pilot mobility, is hot and uncomfortable and obstructs the vision of the pilot, all of which adversely affect pilot efficiency. Representative protective gear presently available for use include an ensemble of a chemical/biological oxygen mask, butyl rubber hood, charcoal filter pack, activated charcoal impregnated undergarment, and butyl rubber glove inserts. A discardable plastic overcape and boots may be worn to protect the pilot from liquid contaminants during transit to the aircraft.

The invention described herein eliminates or substantially reduces in critical importance problems with the prior art by providing a system by which the interior of the aircraft cockpit is protected from airborne contaminants while the canopy is raised, but which allows quick ingress to and egress from the cockpit so that the pilot may operate the aircraft without wearing special protective clothing. By both providing rapid access to the cockpit and allowing substantially unrestricted movement by the pilot in the cockpit the invention may increase turnaround rates and enhance pilot efficiency in operating from a base contaminated by airborne chemical, biological or radioactive agents.

The invention includes a tubular curtain which is sealed at one end to the frame of the cockpit canopy and at the other end to the canopy sill, is deployable with the raising of the canopy in accordian fashion from a stored condition within the sill, and includes a double zipper compatible with a zipper on an oversuit worn by the pilot in transit to the aircraft through which the pilot may enter and exit the cockpit when the curtain is deployed to avoid exposure of the cockpit to airborne contamination.

It is a principal object of the invention to provide a system for protection of a vehicle and the operator thereof from contamination by airborne chemical, biological or radiological agents.

It is a further object of the invention to provide a system including a flexible enclosure operable with the canopy of an aircraft for protecting cockpit and pilot from airborne contamination.

It is yet a further object of the invention to provide a system for protecting the interior of an aircraft cockpit from airborne contaminants while the canopy is raised while allowing ingress and egress to the cockpit.

These and other objects of the invention will become apparent as the detailed description of representative embodiments proceeds.

SUMMARY OF THE INVENTION

In accordance with the foregoing principles and objects of the invention, a system for protecting the cockpit of an aircraft from airborne contamination is described which comprises a generally tubular curtain of size corresponding to that of the canopy and cockpit and being pleated and collapsible along its length between an extended condition and a folded condition; a tray, attachable to and co-extensive with the canopy sill of the aircraft, the tray having a floor and inner and outer walls defining a circumferential recess for receiving the curtain in the folded condition; a lid for covering the tray with the bottom surface thereof in substantial contact with the inner and outer walls of the tray; a circumferential crimpable lip on each the floor of the tray and on the bottom surface of the lid for engaging respective ends of the curtain and providing peripheral hermetic seals between curtain and tray and between curtain and lid; inflatable circumferential seals in the sill and canopy for releasably attaching the tray to the sill and the lid to the canopy for providing hermetic seals between tray and sill and between lid and canopy; and a double zipper in the curtain along a pleat thereof for providing access to the cockpit with the curtain in the extended condition.

DESCRIPTION OF THE DRAWINGS

The invention will be clearly understood from the following detailed description of representative embodiments thereof read in conjunction with the accompanying drawings wherein.

DETAILED DESCRIPTION

Figure 1A:
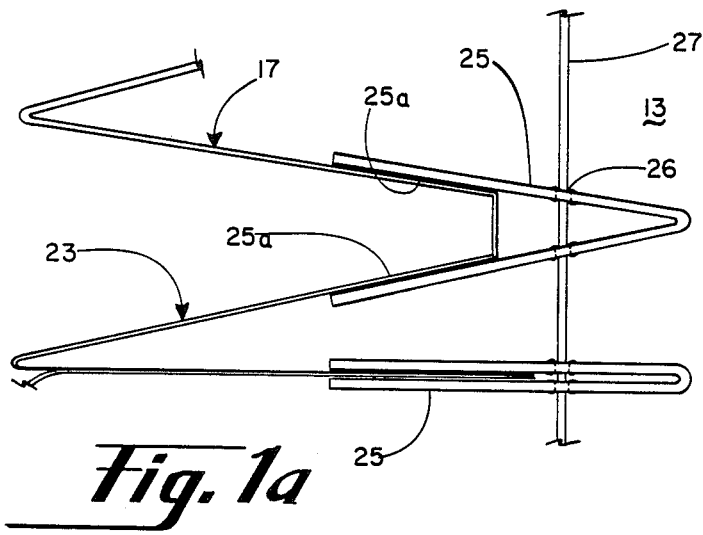
FIG. 1a is a view of the curtain of FIG. 1 along line A—A.
Figure 1:
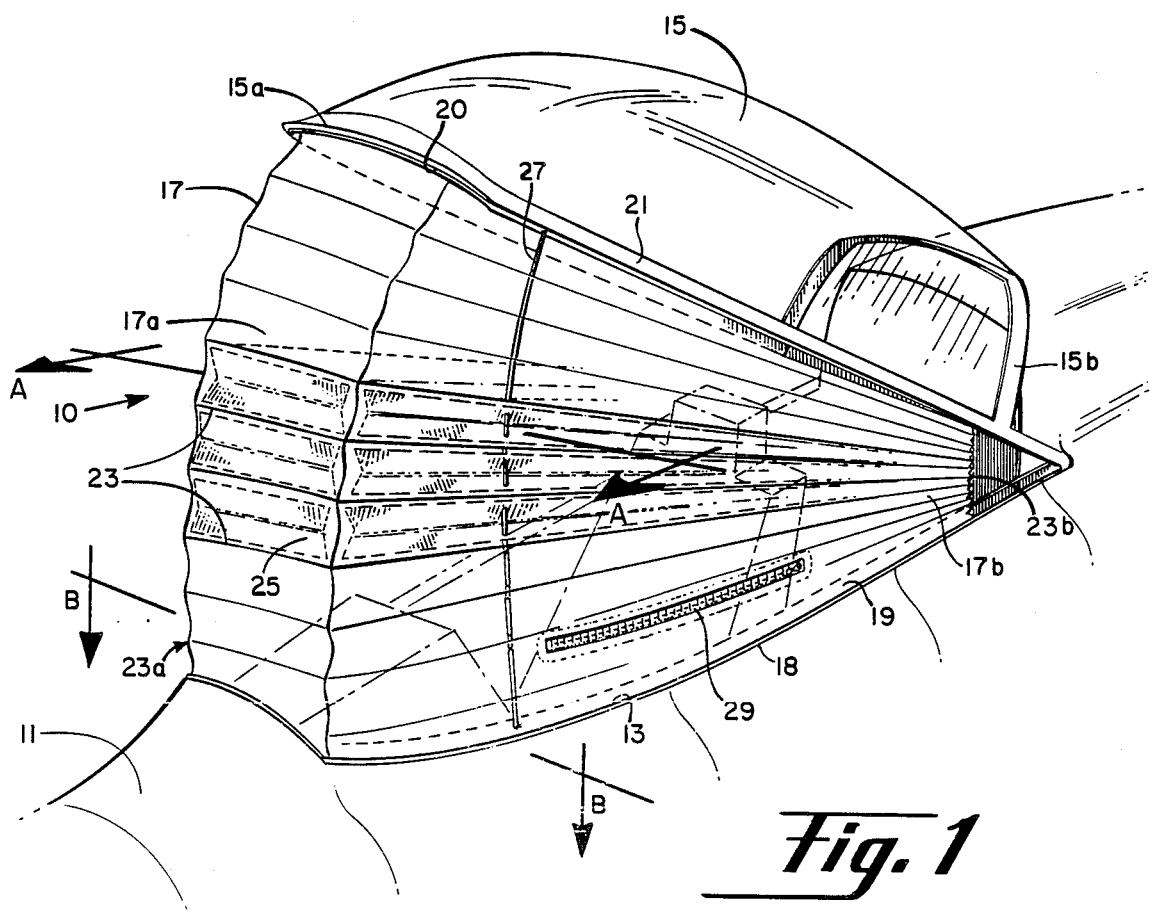
FIG. 1 is a schematic perspective view of the cockpit atmosphere protection system of the invention installed on an aircraft.

Referring now to the drawings, FIG. 1 presents a schematic perspective view of the cockpit atmosphere protection system 10 of the invention as installed on an aircraft 11 interconnecting cockpit 13 and canopy 15 thereof. As suggested above, system 10 is configured to keep cockpit 13 contamination free while canopy 15 is raised in a contaminated environment. System 10 comprises curtain 17 of thin flexible chemical resistant material impervious to chemical and biological agents. Materials suitable for curtain 17 may include plastic, nylon, Saranex ® or Capron ® about 6 to 8 mils (nominally 6 mils) in thickness. Curtain 17 has generally tubular shape with first end 18 for attachment to canopy sill 19 of cockpit 13 and second end 20 for attachment to canopy frame 21 of canopy 15. Curtain 17 has a multiplicity of circumferential pleats 23 along the length thereof between ends 18,20 providing a bellows shape as suggested in FIG. 1. Peripheral airtight seals are provided at the interface of end 18 of curtain 17 with canopy sill 19 and at the interface of end 20 with canopy frame 21 to hermetically enclose cockpit 13 when canopy 15 is raised. It is noted that the opening defined at the front end 15a of canopy 15 is large and in the range of about 5 to 6 feet for several conventional fighter aircraft such as the F-16, system 10 being adaptable within the scope of these teachings to substantially any aircraft having a raisable hinged canopy. Since canopy 15 is normally hinged at the rear end 15b of canopy 15, the opening defined between canopy frame 21 and sill 19 is substantially less near rear end 15b, and of the order of about 1.5 feet. Accordingly, considering the dimensions of the cockpit and canopy of a typical aircraft, the front end 17a of curtain 17 may extend nominally about six feet and contain 24 pleats 23a each about three inches in width, and the rear end 17b of curtain 17 may extend nominally about two feet and contain 24 pleats 23b each about one inch in width; pleats 23 would therefore be tapered from front to rear along corresponding sides of curtain 17 as suggested in FIG. 1. It may be noted here that curtain 17 may be configured with pleats 23 front and back of the same size, with the result that degree of unfolding of curtain 17 in front end 15a of canopy 15 would be greater than at rear end 15b upon raising canopy 15, and, further, the overall dimensions of curtain 17 and number and size of pleats 23a,23b may be selected to correspond to cockpit and canopy dimensions for the aircraft to which system 10 is tailored, may be other than as just stated and are therefore not considered limiting of the invention.

In order to provide some degree of rigidity to curtain 17 and to ensure that pleats 23 repetitively fold and unfold correctly as canopy 15 closes and opens, any suitable plurality of articulated plastic stiffener strips 25 (nominally about two inches wide by 0.025-0.040 inch thick) are folded lengthwise and attached to curtain 17 along the inner fold of each pleat 23 as suggested in FIG. 1a, which is a view of FIG. 1 along line A—A thereof. Stiffener strips 25 overlap curtain 17 about 0.7 inch and are glued or otherwise sealably attached to curtain 17 along a width of about 0.5 inch on each edge of stiffener strips 25 as suggested at 25a of FIG. 1a. This arrangement allows each stiffener strip 25 to fold and expand as desired as curtain 17 opens and closes. Eyelets 26 are provided in each stiffener strip 25 at critical locations (e.g. near the corners front, back and sides and intermediate the corners on the sides of curtain 17) for receiving guide wires 27 as suggested in FIGS. 1,1a. Each guidewire 27 passes through stiffener strip 25 near the inner fold thereof as suggested in FIG. 1a, may be fabricated of nylon, steel, Kevlar TM or other suitable fiber (about 30 pounds test), and are disposed as described to ensure that curtain 17 folds properly upon closure of canopy 15 and to prevent excessive billowing of curtain 17 by wind or cockpit 13 overpressure. A double zipper 29 of preselected length (nominally about 3.5 feet) is disposed along a pleat in curtain 17 near sill 19 for providing access to cockpit 13 as described below.

Figure 2:
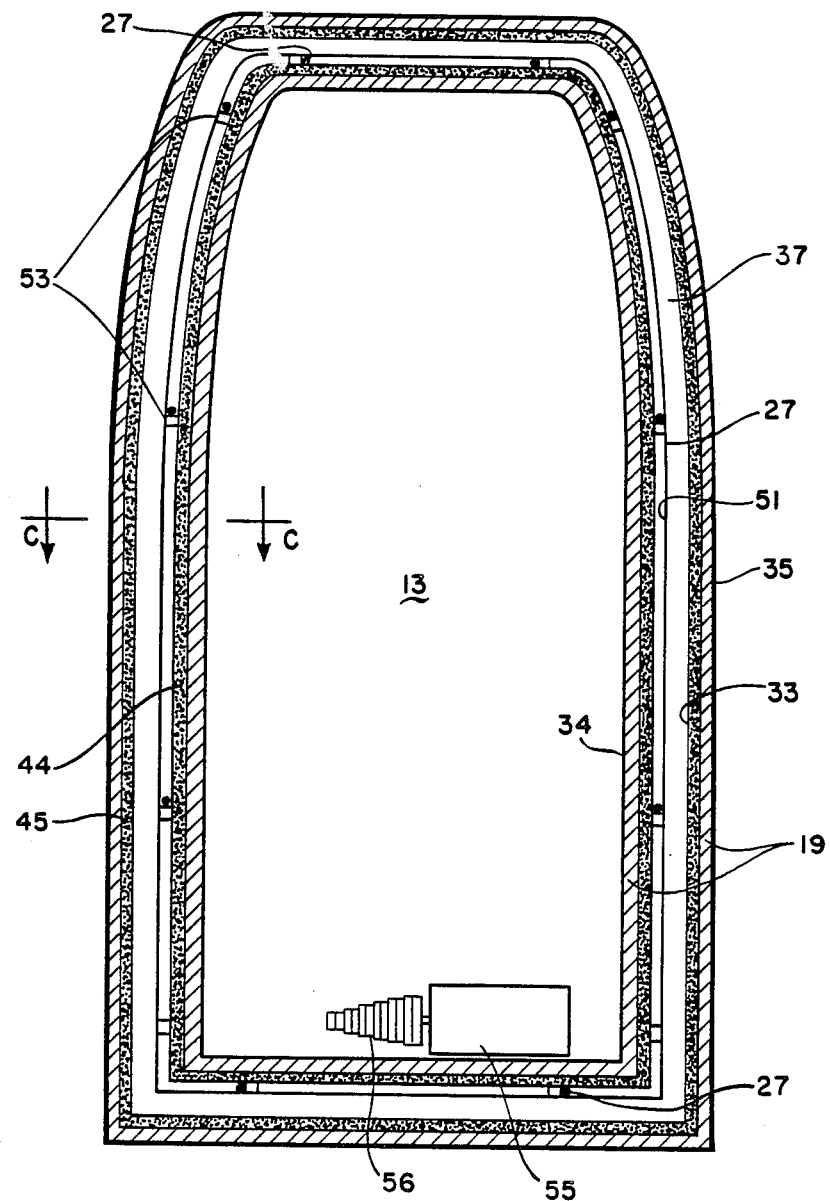
FIG. 2 is a plan view of the cockpit of FIG. 1 along line B—B.
Figure 3:
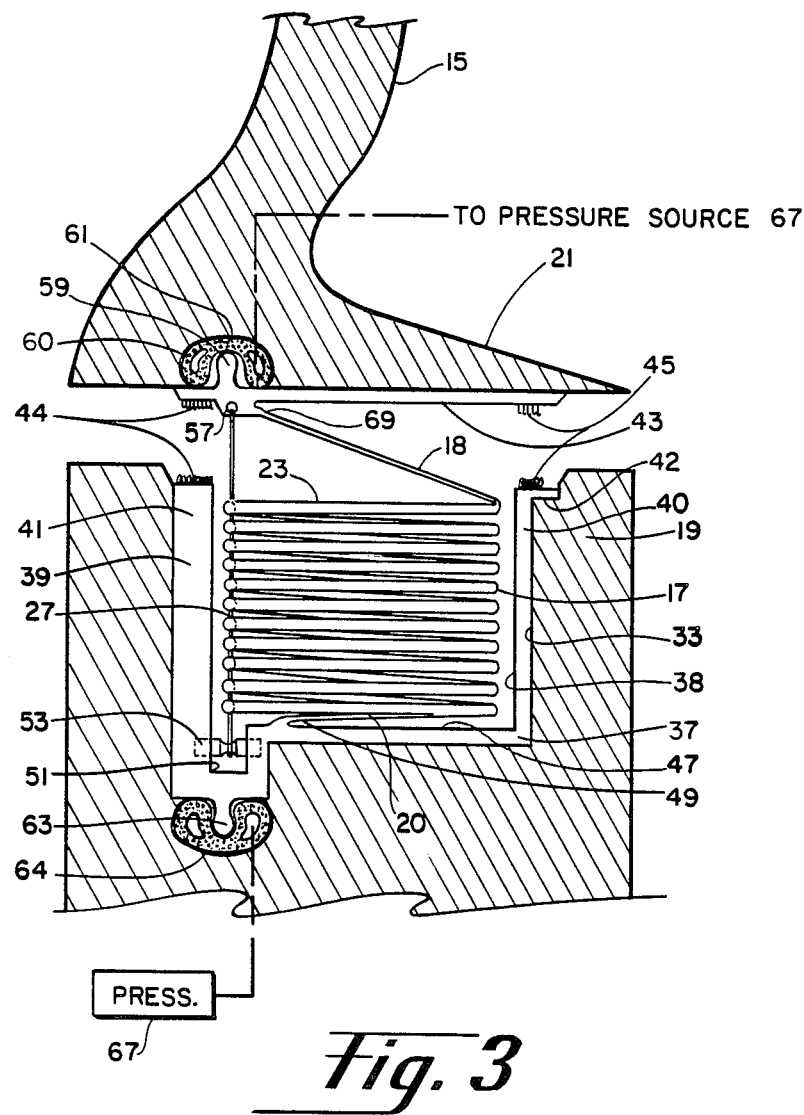
FIG. 3 is a view of the cockpit of FIG. 2 along line C—C.

Reference is now made to FIG. 2, which is a view taken along line B—B of FIG. 1 showing a plan view of canopy sill 19 of cockpit 13. Sill 19 has a channel 33 defined between cockpit wall 34 and outer surface 35 of aircraft 11 for receiving storage tray 37 for receiving and storing curtain 17 when not in use and when canopy 15 is closed. Referring now additionally to FIG. 3, which is a view along line C—C of FIG. 2, shown therein is a sectional view of channel 33 and storage tray 37 with curtain 17 in the folded and stored condition and canopy 15 closed.

Storage tray 37 may have the general shape suggested in FIG. 3 defining a circumferential recess 38 therewithin sized to receive folded curtain 17, guide wires 27 and associated guides and rollers. The width of recess 38 may therefore be about four inches for the curtain 17 size suggested above and may be tapered from front to rear of canopy sill 19 in order to accommodate, if appropriate, smaller pleat 23 size toward the rear of canopy 15; depth of tray 37 may be nominally about 1.75 to 2 inches. Tray 37 may be a unitary structure formed of substantially any appropriate structural material as would occur to one skilled in the applicable field, molded plastic approximately 1/16 inch thick being a preferable material used in fabricating a system built in demonstration of the invention. Inner and outer walls 39,40 between which recess 38 is defined may terminate at the upper ends thereof in suitably configured lip or flange 41,42 for receiving lid 43 releasably attachable to tray 38 at 41,42 utilizing at least one set of nylon fabric fastener hook and pile material strips 44,45 (such as that known commercially as Velcro TM) or other suitable attaching means.

Floor 47 of tray 37 has formed thereon means, such as in the form of circumferential crimpable lip 49, for receiving lower second end 20 of curtain 17 and providing a peripheral hermetic seal therewith at sill 19. A circumferential channel 51 may be defined in floor 47 to accommodate a suitable number of guide wire rollers 53 and to provide a conduit for guide wires 27 to motor 55 mounted in any convenient location to which one end of each guide wire 27 is attached for retracting guide wires 27 in folding curtain upon closing canopy 15. The lower surface of lid 43 has formed thereon at suitable locations guide wire attachment eyelets 57 or other suitable attachment means for guide wires 27.

The upper surface of lid 43 has formed thereon circumferential tongue 59 for sealably engaging canopy frame 21, such as at inflatable seal 60 disposed within groove 61 in frame 21 substantially as shown in FIG. 3. Similarly, the lower surface of tray 37 has formed thereon a corresponding circumferential tongue 63 for sealably engaging canopy sill 19, such as at inflatable seal 64 disposed within channel 33 in sill 19. Each inflatable seal 60,64 may be individually operatively connected to a source 67 of compressed gas, such as a $CO_2$ cartridge, for selectively inflating seals 60,64 in the operation of system 10 as described below. Means both inside and outside aircraft 11 may be included to activate source 67, for deployment of curtain 17 with the raising of canopy 15. For reasons more apparent from a reading of the operation of the invention hereinafter, it may be preferable for tongue 59 to be formed on lid 43 at a point opposite guide wire attachment means (eyelets) 57 as suggested in FIG. 3. The lower surface of lid 43 has, similarly to floor 47 of tray 37, means formed thereon, such as in the form of circumferential crimpable lip 69 for receiving the upper first end 18 of curtain 17 and providing a peripheral hermetic seal therewith at canopy frame 21. Lid 43 together with tongue 59 and lip 69 thereon may, like tray 37, be formed of molded plastic or other suitable structural material. It is noted that lid 43 attached to tray 37 at Velcro TM strips 44,45 provide protective storage for curtain 17, wires 27 and other components when system 10 is not in use. A desirable attribute of system 10 as just described is, further, that the entire system including curtain 17, tray 37, lid 43 and associated seals, rollers, guides and wires may be replaceable as a unit. Overall weight of system 10 may be less than about 35 pounds.

In utilizing system 10 in the intended environment requiring protection of cockpit 13 from airborne contamination, it is noted that system 10 may, as suggested above, be installed in the canopy sill 19 of an aircraft 11 with lid 43 attached to storage tray 37 by strips 44,45 to cover and protect tray 37, curtain 17 and guide wires 27 in a retracted stored condition therewithin. Motor 55 may be mounted in any convenient location within cockpit 13 and connected to guide wires 27 in readiness for use. Seal 60 remains deflated when system 10 is not in use so that canopy 15 may be raised and lowered without engaging lid 43 at tongue 59. Seal 64 may or may not be inflated when system 10 is not in use so long as tray 37 otherwise remains firmly held within sill 19 while system 10 is inoperative. When system 10 is activated so as to protect cockpit 13 from contamination when canopy 15 is raised, source 67 of compressed gas is activated to inflate seals 60,64 to engage respective tongues 59,63. Tongues 59,63 have a beaded cross section as suggested in FIG. 3 so that inflation of seals 60,64 both firmly engages tongues 59,63 and hermetically seals lid 43 with canopy frame 21 and tray 37 with canopy sill 19 to preclude leakage therearound into cockpit 13 when system 10 is activated. Once system 10 is activated and seals 60,64 engage tongues 59,63 raising canopy 15 pulls lid 43 from storage tray 37 at strips 44,45 and deploys curtain 17 to the condition shown in FIG. 1. In order to accommodate winding and extending wires 27 as canopy 15 opens and closes, motor 55 may be equipped with friction driven or clutched takeup reels 56 of sizes corresponding to the lengths of guide wires 27 to be taken up in the closing of canopy 15. Motor 55 may be activatable simultaneously with the conventional canopy 15 closing system (not shown) included in aircraft 11.

Figure 4:
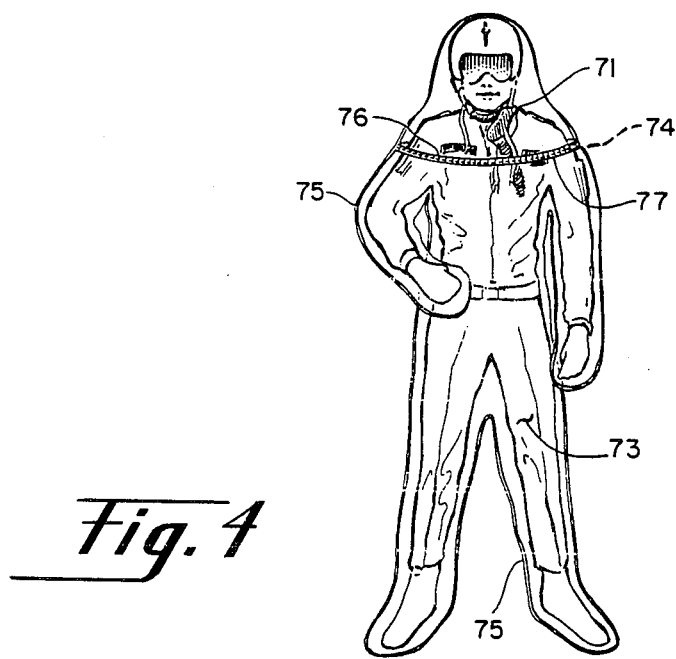
FIG. 4 is an illustration of an oversuit compatible with the system of FIGS. 1-3 for pilot use in transit to the aircraft.

Referring now to FIG. 4, shown therein is an illustration of an oversuit 70 compatible with system 10 of FIGS. 1-3 for wear by a pilot 71 in transit to or from aircraft 11 through a contaminated environment. In a representative configuration, oversuit 70 may comprise a light weight, flexible tough and chemically impervious material sized to loosely fit pilot 71 fully clothed with flight gear. Representative materials for oversuit 70 include plastic, nylon, Saranex ®, Capron ® or similar type materials of nominally 4 to 6 mils thickness. Oversuit 70 may be formed of suitably sized and configured front and rear panels 73,74 joined at peripheral seams 75 to define suitably shaped oversuit portions for receiving arms, legs, trunk and head of pilot 71. Any conventional method for joining panels 73,74 at seams 75 may be used to provide a hermetic seal including gluing, stitching, heat sealing, or the like or a combination of two or more such methods. Butyl rubber panels cut to appropriate size may be sealed into bottoms of oversuit 70 portions configured for receiving the legs and feet of pilot 71 to imitate boots or overshoes and to facilitate walking in oversuit 70.

A transverse opening 76 (nominally about 42 inches long) is provided in oversuit 70 at any convenient location as suggested in FIG. 4 to receive double zipper 77 corresponding in size and type and joinable to zipper 29 in curtain 17. Zipper 77 may be sewn, sealed or otherwise fabricated into oversuit 70 at opening 76 in order to provide means for pilot 71 to enter and exit oversuit 70 with facility. The combination of zippers 29,77 may be as taught in U.S. Pat. No. 4,485,489 entitled "Entrance and Egress System for Protective Shelters and Garments" and U.S. Pat. No. 4,485,534 entitled "Interchange Mechanism for Multiple Fasteners" the teachings of which are incorporated herein by reference.

Figure 5:
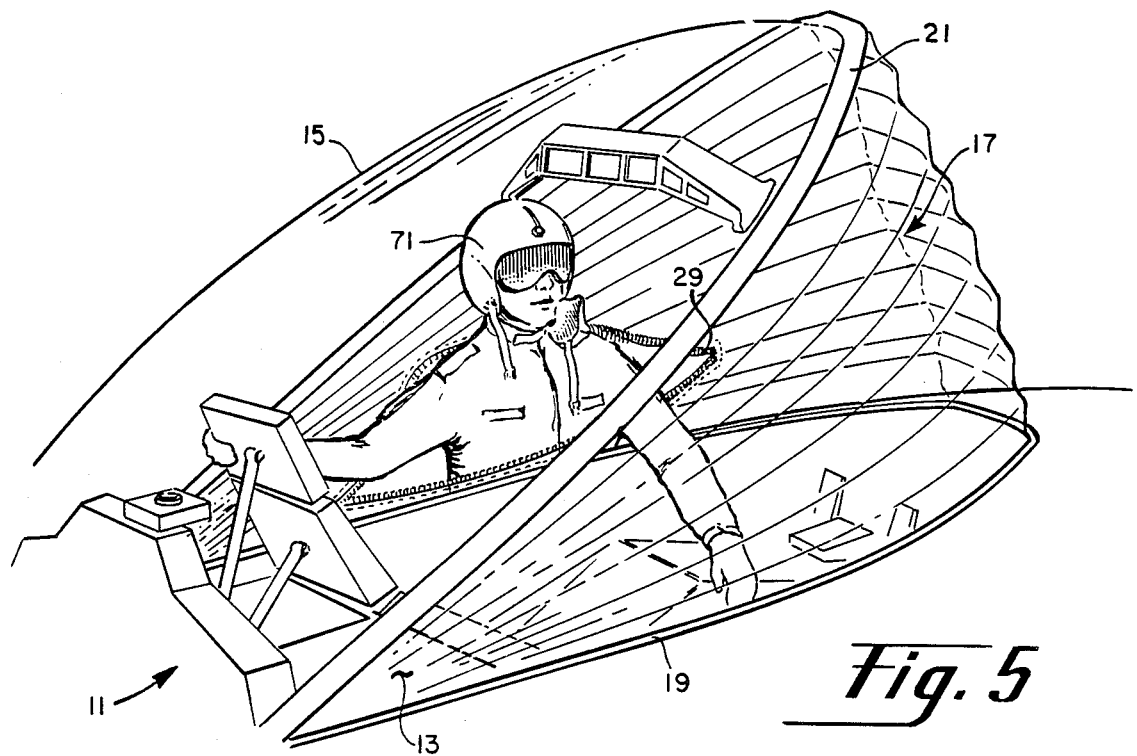
FIG. 5 is an illustration of a pilot utilizing the system of FIGS. 1-3 and the oversuit of FIG. 4 in entering the aircraft.

Referring now additionally to FIG. 5, shown therein is an illustration of pilot 71 utilizing system 10 of FIGS. 1-3 and oversuit 70 of FIG. 4 to enter cockpit 13 of aircraft 11 with canopy 15 raised and curtain 17 in the extended condition. In the process of entering aircraft 11 in a contaminated environment, pilot 71 first joins oversuit 70 to curtain 17 at zippers 29,77 and then opens zippers 29,77 to provide an opening into cockpit 13. Pilot 71 exits oversuit 70 through the opening then defined by open zippers 29,77 leaving oversuit 70 outside curtain 17. Once inside curtain 17, pilot 71 closes zippers 29,77 from within cockpit 13 which allows oversuit 70 to fall away from the outer surface of curtain 17 for discard. In order to exit cockpit 13 as at the end of a mission, a spare oversuit 70' carried within aircraft 11 for purposes of providing egress is first zipped into curtain 17 from within cockpit 13, and zippers 29, 77 are opened. Oversuit 70' is then turned inside out by pushing it through open zippers 29,77 to the exterior of curtain 17. Pilot 71 then enters oversuit 70' through the opening defined by open zippers 29,77 and the procedure for attaching the oversuit to the curtain is reversed in order to disconnect from aircraft 11.

It is noted that the inclusion of double zipper 29,77 in the construction of curtain 17 and oversuit 70 allows pilot 71 to enter and exit cockpit 13 without exposing himself or cockpit 13 to a contaminated outside environment. The invention therefore allows the pilot to operate the aircraft wearing standard flight gear. Additional equipment may be used in conjunction with system 10 and oversuit 70. For example, oversuit 70 may be equipped with conventional compressed air supply, air filtration means or the like to provide fresh air for consumption by pilot 71 in transit from a shelter to aircraft 11. Likewise, cockpit 13 may be provided with suitable air filtration and pressurization equipment to protect the interior of aircraft 11 while canopy 15 is raised with curtain 17 extended as depicted in FIGS. 1 and 5.

It is noted that system 10 may be configured to seal the door and opening therefor in vehicles other than aircraft, such as in refueling trucks for aircraft, in armored personnel carriers, etc., for protection of the vehicle cab and operator from airborne contamination. The invention would therefore allow the vehicle operator or crew to operate within the vehicle in a clean environment.

The invention therefore provides an improved system to protect vehicles and operators thereof from airborne contamination. It is understood that modifications to the invention may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or the scope of the appended claims.

We claim:

1. A system for protecting the cockpit of an aircraft from airborne contamination, said cockpit having a hinged canopy and a canopy sill around the periphery of said cockpit, said canopy having a closed position in sealed engagement with said sill and an open position detached from said sill, said system comprising:
   (a) a generally tubular curtain of preselected size corresponding to the size of said canopy and said cockpit, said curtain having a first curtain end and a second curtain end and a first plurality of circumferential pleats along the length thereof and being collapsible along the length thereof between an extended condition and a folded condition;
   (b) a tray of preselected size attachable to and substantially co-extensive with said sill around the periphery thereof, said tray having a floor and inner and outer walls defining a circumferential recess therewithin sized to receive said curtain in said folded condition, each of said inner and outer walls terminating at the upper ends thereof in a shoulder;
   (c) said floor of said tray having means defined thereon and around the circumferential extent thereof for engaging said second curtain end and providing a peripheral hermetic seal with said second curtain end and said tray;
   (d) a lid having a top surface and a bottom surface and sized for covering said tray with said bottom surface in substantial contact with each shoulder of said inner and outer walls;
   (e) said lid having on said bottom surface thereof means defined thereon and around the circumferential extent thereof for engaging said first curtain end and providing a peripheral hermetic seal between said first curtain end and said lid;
   (f) means for attaching said tray to said sill and for providing a hermetic seal between said tray and sill, and releasable means for releasably attaching said lid to said canopy and for providing a hermetic seal between said lid and said canopy; and
   (g) means defining a zipper in said curtain along a pleat thereof for providing access to said cockpit with said curtain in said extended condition.

2. The system of claim 1 further comprising:
   (h) a second plurality of stiffener strips disposed on selected said pleats along the inner folds thereof and extending substantially the length of each said pleat for repetitively pleating said curtain as said curtain is collapsed from said extended condition to said folded condition.

3. The system of claim 2 further comprising:
   (i) a third plurality of eyelets in said stiffener strips at selected locations along said curtain;
   (j) a motor;
   (k) a circumferential channel defined in said floor of said tray, and a fourth plurality of rollers mounted transverse of said channel at selected locations around the circumferential extent thereof; and
   (l) a sixth plurality of guide wires attached at respective first ends thereof to said bottom surface of said lid and extending through said eyelets in said stiffener strips and around said rollers and operatively connected at respective second ends thereof to said motor for guiding said curtain between said extended and said folded condition as said canopy is raised and lowered.

4. The system of claim 1 wherein said means for attaching said tray to said sill and said lid to said canopy comprises a first circumferential tongue on the bottom of said tray and a second circumferential tongue on said top surface of said lid, and a first inflatable circumferential seal disposed in said sill for releasably receiving said first tongue in sealing engagement therewith and a second inflatable circumferential seal disposed in said canopy for releasably receiving said second tongue in sealing engagement therewith.

5. The system of claim 4 further comprising a source of compressed gas operatively attached to each of said first inflatable circumferential seal and said second inflatable circumferential seal for selective inflation thereof.

6. The system of claim 1 wherein said means on said floor of said tray for engaging said second curtain end and providing a peripheral hermetic seal between said second curtain end and said sill comprises a substantially continuous circumferential crimpable lip.

7. The system of claim 1 wherein said means on said bottom surface of said lid for engaging said first curtain end and providing a peripheral hermetic seal between said first curtain end and said canopy comprises a substantially continuous circumferential crimpable lip.

8. The system of claim 1 further comprising means disposed on said bottom of said lid and on at least one of said shoulders for releasably holding said lid to said tray with said curtain therewithin in said folded condition.

9. The system of claim 8 wherein said means for releasably holding said lid to said tray comprises a strip of hook material on one of said bottom surface of said lid and said at least one of said shoulders and a strip of pile material on the other of said bottom surface of said lid and said at least one of said shoulders.

10. The system of claim 1 wherein said curtain comprises a material selected from the group consisting of plastic and nylon.

11. A system for protecting the cockpit of an aircraft from airborne contamination, said cockpit having a hinged canopy and a canopy sill around the periphery of said cockpit, said canopy having a closed position in sealed engagement with said sill and an open position detached from said sill, said system comprising:
   (a) a generally tubular curtain of preselected size corresponding to the size of said canopy and said cockpit, said curtain having a first curtain end and a second curtain end and a first plurality of circumferential pleats along the length thereof and being collapsible along the length thereof between an extended condition and a folded condition;
   (b) a second plurality of stiffener strips disposed on selected said pleats along the inner folds thereof and extending substantially the length of each said pleat for repetitively pleating said curtain as said curtain is collapsed from said extended condition to said folded condition, said stiffener strips having a third plurality of eyelets therein at selected locations along said curtain;
   (c) a tray of preselected size attachable to and substantially co-extensive with said sill around the periphery thereof, said tray having a floor and inner and outer walls defining a circumferential recess therewithin sized to receive said curtain in said folded condition, each of said inner and outer walls terminating at the upper ends thereof in a shoulder;

(d) said floor of said tray having means defined thereon and around the circumferential extent thereof for engaging said second curtain end and providing a peripheral hermetic seal with said second curtain end and said tray, said floor further having a circumferential channel defined therein, and a fourth plurality of rollers mounted transverse of said channel at selected locations around the circumferential extent thereof;

(e) a lid having a top surface and a bottom surface and sized for covering said tray with said bottom surface in substantial contact with each shoulder of said inner and outer walls;

(f) said lid having on said bottom surface thereof means defined thereon and around the circumferential extent thereof for engaging said first curtain end and providing a peripheral hermetic seal between said first curtain end and said lid;

(g) means for attaching said tray to said sill and for providing a hermetic seal between said tray and sill, and releasable means for releasably attaching said lid to said canopy and for providing a hermetic seal between said lid and said canopy;

(h) a motor;

(i) a fifth plurality of guide wires attached at respective first ends thereof to said bottom surface of said lid and extending through said eyelets in said stiffener strips and around said rollers and operatively connected at respective second ends thereof to said motor for guiding said curtain between said extended and said folded condition as said canopy is raised and lowered; and (j) means defining a zipper in said curtain along a pleat thereof for providing access to said cockpit with said curtain in said extended condition.

12. The system of claim 11 wherein said means for attaching said tray to said sill and said lid to said canopy comprises a first circumferential tongue on the bottom of said tray and a second circumferential tongue on said top surface of said lid, and a first inflatable circumferential seal disposed in said sill for releasably receiving said first tongue in sealing engagement therewith and a second inflatable circumferential seal disposed in said canopy for releasably receiving said second tongue in sealing engagement therewith.

13. The system of claim 12 further comprising a source of compressed gas operatively attached to each of said first inflatable circumferential seal and said second inflatable circumferential seal for selective inflation thereof.

14. The system of claim 11 wherein said means on said floor of said tray for engaging said second curtain end and providing a peripheral hermetic seal between said second curtain end and said sill comprises a substantially continuous circumferential crimpable lip.

15. The system of claim 11 wherein said means on said bottom surface of said lid for engaging said first curtain end and providing a peripheral hermetic seal between said first curtain end and said canopy comprises a substantially continuous circumferential crimpable lip.

16. The system of claim 11 further comprising means disposed on said bottom of said lid and on at least one of said shoulders for releasably holding said lid to said tray with said curtain therewithin in said folded condition.

17. The system of claim 16 wherein said means for releasably holding said lid to said tray comprises a strip of hook material on one of said bottom surface of said lid and said at least one of said shoulders and a strip of pile material on the other of said bottom surface of said lid and said at least one of said shoulders.

18. The system of claim 11 wherein said curtain comprises a material selected from the group consisting of plastic and nylon.

* * * * *